(12) United States Patent
Tycksen, Jr. et al.

(10) Patent No.: US 6,189,097 B1
(45) Date of Patent: Feb. 13, 2001

(54) DIGITAL CERTIFICATE

(75) Inventors: Frank A. Tycksen, Jr., Beaverton; Charles W. Jennings, Portland, both of OR (US)

(73) Assignee: Preview Systems, Inc., Sunnyvale, CA (US)

( * ) Notice: Under 35 U.S.C. 154(b), the term of this patent shall be extended for 0 days.

(21) Appl. No.: 08/822,661

(22) Filed: Mar. 24, 1997

(51) Int. Cl.⁷ ........................................................ H04L 9/00
(52) U.S. Cl. ............................................. 713/156; 713/100
(58) Field of Search ...................... 380/25, 30; 713/156, 713/160

(56) References Cited

U.S. PATENT DOCUMENTS

| | | |
|---|---|---|
| 4,528,643 | 7/1985 | Freeny, Jr. . |
| 4,868,877 * | 9/1989 | Fischer ................................. 380/30 |
| 5,341,429 | 8/1994 | Stringer et al. . |
| 5,721,781 * | 2/1998 | Deo et al. ............................. 380/25 |

* cited by examiner

Primary Examiner—Salvatore Cangialosi
(74) Attorney, Agent, or Firm—Keith A. Cushing

(57) ABSTRACT

A digital certificate includes framing characters defining a protected area. The protected area contains a selected set of components, including text-based components and binary-based components, and the certificate serves as a transport container for such components. A message digest or hashing algorithm applied to the protected area provides consistent results despite modifications to the certificate outside the protected area. A digital signature provides authentication of source and content integrity. Digital certificates under the present invention may be applied to a variety of purposes including but not limited to proof of ownership, gift certificates, upgrade purchases, and other applications where verification of source and content integrity are desirable.

36 Claims, 12 Drawing Sheets

```
10a
10b  ################################################################
      #  This document has been digitally signed! Do not alter!  #  Hash begins
      #                                                          #
11a   #Certificate: MSN001239987                                 <#
      #                                                          #
11b   #Licenser: Microsoft Corporation                           <#
11c   #Description: Microsoft Word for Windows 7.0               <#
11d   #Part Number: 777-12345-22                                 <#
11e   #Catalog Number: 000000000011                              <#
      #                                                          #
11f   #Licensee: John Q. Public                                  <#
11g   #Organization: ACME Corporation                            <#        10
11h   #Location: 01A249S44G99876Y                                <#
      #                                                          #
11i   #Support Terms: This license entitles you to receive 90 day#
      #s free technical support or you can reach us via          <#
      #                                                          #
11j   #FAQs: www.microsoft.com/mswordfaqs                        <#
11k   #Website: www.microsoft.com/msword                         <#
11l   #E-mail: wordsupport@microsoft.com                         <#
11m   #Voice: 800-555-9999                                       <#
11n   #Fax: 206-555-9998                                         <#
11o   #                                                          #
      #License Terms: You agree to accept the terms of this licen#
      #se and are bound by this legal description                <#
11p   #License Expires: Perpetual                                <#
      #                                                          #
11q   #Signed by: Acme Clearinghouse Inc.                        <#
11r   #Signed on: 1996/06/12 at 22:00:55                         <#  Hash ends
10c   ################################################################
11s   #Signature: Cdr-eFKla+sdlkfQ9yZrFTA                        <#
10c   ################################################################
```

```
#########################################    # Hash begins
#                                             #
# This document has been digitally signed! Do not alter! #
#                                             <#
#Certificate: MSN001239987                    <#
#                                             <#
#Licenser: Microsoft Corporation              <#
#Description: Microsoft Word for Windows 7.0  <#
#Part Number: 777-12345-22                    <#
#Catalog Number: 00000000011                  <#
#                                             <#
#Licensee: John Q. Public                     <#
#Organization: ACME Corporation               <#
#Location: 01A249S44G99876Y                   <#
#                                             #
#Support Terms: This license entitles you to receive 90 day#
#s free technical support or you can reach us via          <#
#FAQs: www.microsoft.com/mswordfaqs           <#
#Website: www.microsoft.com/msword            <#
#E-mail: wordsupport@microsoft.com            <#
#Voice: 800-555-9999                          <#
#Fax: 206-555-9998                            <#
#                                             #
#License Terms: You agree to accept the terms of this licen#
#se and are bound by this legal description   <#
#License Expires: Perpetual                   <#
#                                             #
#Signed by: Acme Clearinghouse Inc.           <#
#Signed on: 1996/06/12 at 22:00:55            <#
######################################### # Hash ends
#Signature: Cdr-eFKla+sdlkfQ9yzrFTA            <#
###############################################

FIG. 1
```

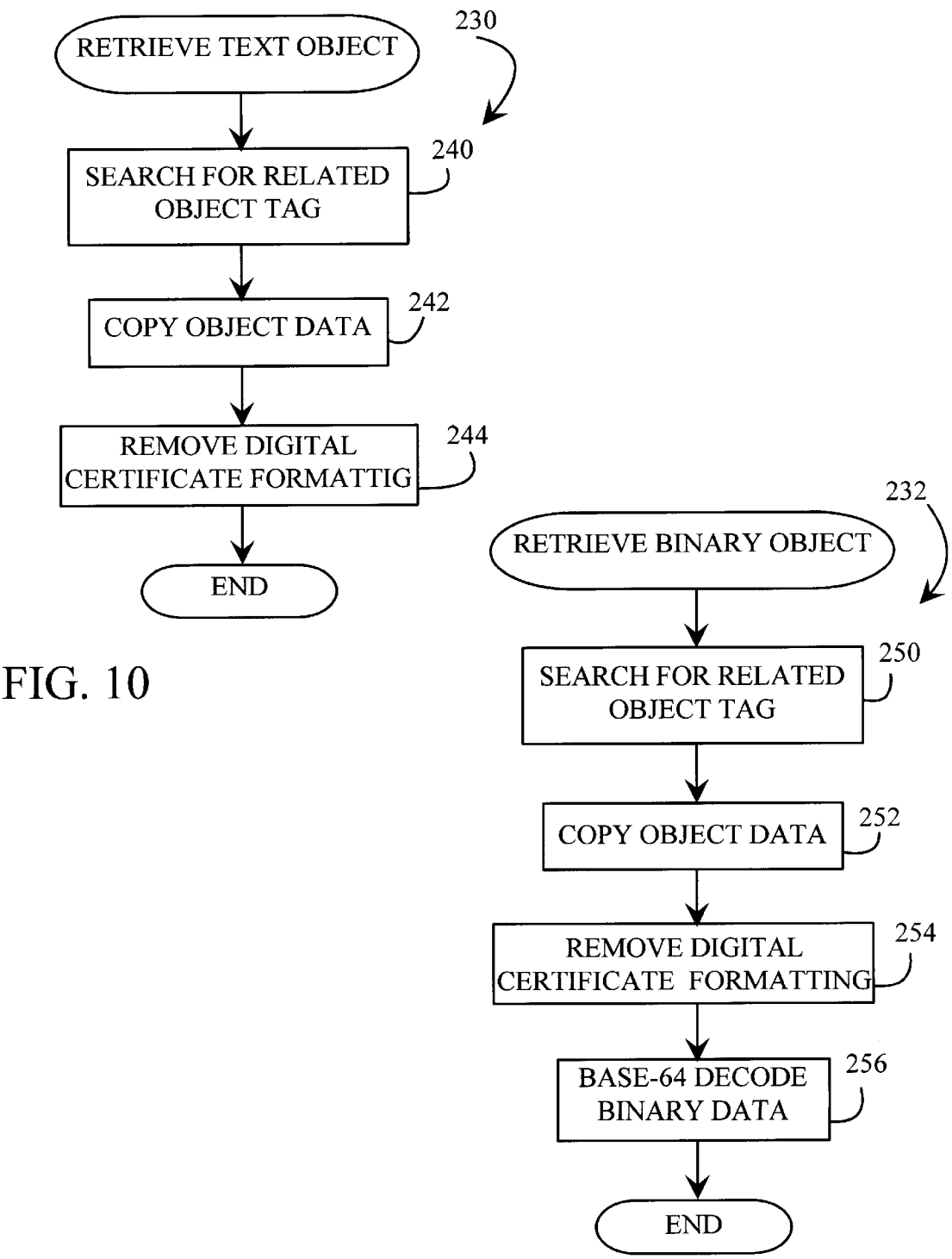

```
####################################################################
#This document has been digitally signed! Do not alter!    #
#                                                                  #
#DSLC Demo by Portland Software, Inc.                           <#
#                                                                  #
#Demo Overview: This demonstration shows the format of a co#
#mpleted DSLC.  It is properly formatted and contains two e#
#mbedded objects.  Both objects are Microsoft Windows forma#
#tted bitmaps.                                                  <#
#                                                                  #
#                                                                  #
#Bitmap 1: 190 Qk2+AAAAAAAAD4AAAAoAAAAIAAAACAAAAABAAEAAAAA#
#AIAAAADODgAAxA4AAAIAAAACAAAAgAAAAP8AAAAgMB54AAAMMAAAAYAAAY#
#PGAgGDxgAAAYAAAAwwADAeeCAwHngAAAwwAAABgAABg8YCAYPGAAABgAAA#
#DDAAMB54IDAeeAAADDAAAAGAAAGDxgIBg8YAAAGAAAAMMAAwHnggMB54AA#
#AMMAAAAYAAAYPGAgGDxgAAAYAAAAwwADAeeA==                         <#
#                                                                  #
#Bitmap 2: 578 Qk1CAgAAAAAAAEIAAAAoAAAAIAAAACAAAAABAAQAAAAA#
#AAACAAATCwAAEwsAAAMAAAADAAAAAAAAAAAgAAAAP8AESEQEQEAEBACAg#
#ECEQEBECAgIhAQAQEBAhACEQIQIBEhIAEBEQAQEAIBIRAhhAQEBEQESAB#
#AQECAREBAQIAIiEgAQERABAQAgEhECECEBAQERARIAEBAQIBEQEBAgAiEh#
#IhECIAEBACIQEQERAhEBABAgIQAQEBAgERIhABEBEQIQECIQAQEAIQAQER#
#EBIQIQEhAQEBAQECAQERAAEQEhASEBERABAQAhIRIRERARAgABEgIQEBAQ#
#IRECEBARARESEQAiIAEBACAQEiEQEREBAgESEBAQEBAiERABERIgAREREh#
#EgAQEAIRABIQEQERIiIiIiIhAQECIiIiIiIhAQEBAQEBAQEBAQEBAQEB#
#ABAQEBAQEBAQEBAQEBEBAQEBAQEBAQEBAQEBAQEAEBAQEBAQEBAQEB#
#AQEBAQEQEBAQEBAQEBAQEBAQAAAAAABAQEAAAAAAAAAAAAAAAAAAB#
#AQAAAAAAAAARESEBIQEBAQICECAhICAhCAQACAAEBACESEBEQEBABAh#
#AREAAQEBAhAgEQERISEhAREAIgAQEAIBEgIhAQEBIRABEBABAQECEQEAER#
#EREAIQEQESABAQAhAhAQEBISEgEAESEAEBAQIhIhEQICAhAQEQEAEAEBAC#
#AhAAIgEBASIRIhEQAQEBAhEAIQAQICA=                               <#
#                                                                  #
#Signed on: 03/04/97 at 10:07:00                                <#
#Signed by: Trusted Third Party, Inc.                           <#
####################################################################
#Signature: A5D0D9fvkDAeJUKbly2OkbDG5yC9byxYWXpFpoCXPRPVcxt#
#oWydM7KUOEncuMDHEShWGVirslqeRKDNrcWLdXJQ4ADKidW/ZFLvpuWME3#
#ri6VDjceInwrrwhSA18JleXRToGiF+3W5UKR63cmZjvcAqjPCE3vObIJQL#
#WSeLhQcc=                                                      <#
####################################################################
```

FIG. 15

DIGITAL CERTIFICATE

FIELD OF THE INVENTION

The present invention relates generally to computer technology, and particularly to use and structure of digital certificates.

BACKGROUND OF THE INVENTION

Computers store, share and manipulate digital products, e.g., digital information, data, content or programming. Digital products can be replicated accurately and shared widely among many computer systems. Computers share or receive digital products in a variety contexts. Digital products can be stored, exchanged and delivered by way of magnetic (floppy diskette) or optical (CD-ROM) storage devices. Computers operating in network environments, e.g., in a local area network, a wide area network, or the well known Internet global communications system, pass digital products back and forth freely and often in great volume. Wide-spread replication and distribution of digital products supports new methods of digital product manufacturing and distribution, i.e., digitally stored items can be copied and distributed electronically outside the traditional methods of product manufacture and distribution.

Because digital products can be electronically replicated and distributed widely, a question of authenticity often arises with respect to certain digitally stored items. For example, a person purchasing a digital product via the Internet wants assurance of the authenticity of the product, i.e., that the digital product purchased is in fact what it purports to be and originates from the purported source without corruption. A digital product publisher needs authentication of ownership for persons requesting technical support or upgrading to a next version of a given digital product. Thus, persons purchasing a digital product want an authentic copy and publishers want only to support or allow upgrades relative to an authentic copy. The problem with digital products is that copies are identical to the original product and proving authenticity of source or authenticity of ownership of a given digital product goes beyond mere possession because possession can be achieved easily by copying.

Publishers of digital products have attached a physical certificate of authentication to digital products, e.g., a certificate physically attached to an associated product manual or product packaging. Such physical certificates of authentication include ornate artwork, e.g. complex and intricate graphics and holographic images, difficult to replicate. By providing such a physical certificate of authenticity with a digital product the publisher provides assurance that the associated digital product is intact and that it originates from the purported source. Thus, possession of such a physical certificate both corresponds to ownership and proves authenticity of source. Such physical certificates, however, cannot be used in electronic distribution schemes, e.g., where digital product distribution or purchase is by way of network or Internet interaction.

Digital products are subject to alteration or corruption, either intentionally or unintentionally. Unintentional corruption may occur during transmission or as stored on a particular distribution medium. Some data exchange or transmission mechanisms, e.g., electronic mail (E-mail) or file transfer protocols, introduce corruption by introducing additional characters, sometimes outside the ASCII code set. For example, some electronic mail transfers introduce characters at the beginning of each line. Other examples of corruption during file transfer include changes in line termination indicators, i.e., line feed, carriage return, and trailing spaces modified relative to the original document. Additional characters outside the ASCII code set are often apparent due to the effect such characters have on document appearance, especially for screen displays and when printing a document.

Intentional corruption may be malicious and may include placement of "viruses" within a digital product. Persons acquiring digital products want verification that a particular digital product has been not been altered either intentionally or unintentionally. For example, persons purchasing digital products want assurance that the digital product contains no viruses and that the product is intact, i.e., in its condition as originally published. Publishers of digital products want to deliver products intact and without corruption and want such product condition to be evident to the purchaser.

Furthermore, the need to prove authenticity of digitally stored items goes beyond electronic digital product distribution schemes. For example, a person obtaining certain information, e.g., an insurance quote, may wish to transmit such information to a third-party entity and be able to prove its authenticity. The person obtaining the information, the entity providing the information, and any third-party entity later receiving the information desire accuracy and authentication, i.e., each want to maintain the information intact and in an authenticatable form.

A common form of encryption used in network communication systems, e.g., the Internet, is by means of public/private keys, also known as public key infrastructure (PKI). The fact that public keys are public under PKI gives rise to the possibility of impersonation, i.e., someone making use of a public key and impersonating the entity associated with that key. A public key can be posted, purportedly belonging to one individual, but in fact created by another entity impersonating that individual.

Digital certificates have been employed in the context of encryption on the Internet to establish authenticity of public keys, i.e., to ensure that a given public key in fact belongs to the person purportedly associated therewith. This mechanism requires a trusted third party or "certification authority" (CA) responsible for checking each purported owner's claim to the published public key, i.e., requiring some proof of identification of persons publishing and posting public keys for purposes of encryption on the Internet. The certification authority then adds its digital signature to the public key and this, in effect, validates the public key. Compatibility, therefore, is necessary for wide spread and effective use of such digital certificates. Digital certificates issued by different certification authorities must be compatible in a context of encryption and decryption on a global communications network, i.e., the Internet. Software used to check and certify public keys must reference some standard protocol to be universally effective. One proposed standard form for digital certificates is commonly referred to as the "X.509" standard. This standard was originally part of a "X.500" series of standards, but has been extended to embrace a wide variety of Internet services such as E-mail, worldwide web protocols, user authentication, and electronic commerce. It is considered likely that the "X.509" standard will be accepted and rapidly incorporated into many products employing digital certificates based on the preliminary version of the "X.509" digital certificate standard. Such "X.509" certificates, however, do not possess the degree of robustness available under the present invention and currently are not equipped to do anything more than contain and verify the authentication of the holder.

Some software publishers, e.g., Microsoft, implement a "code signing" infrastructure where software developers "sign" their executables to authenticate such executables and ensure against corruption. Digitally signing executables in this fashion requires use of a software development kit (SDK) whereby the development process integrates the digital signing process. When the executable runs, it attempts to transact a verification process or transaction across the Internet. This is specifically for Internet-based programs. When the Internet verification transaction is triggered upon execution of the program, the program informs a certification authority (CA) that "I think I am Microsoft Windows", for example, and "this is my digital signature." The certification authority (CA) then independently calculates the correct digital signature. If the digital signatures match, i.e., the digital signature calculated at the certification authority and the digital signature presented by the executing program via the Internet verification transaction, then execution is allowed to continue. If the signatures don't match, then the executable has been corrupted or does in fact not originate from the publisher and is not what it purports to be. This mechanism authenticates that the software is in fact the product it purports to be and also that the product is being executed by the appropriate licensee. This mechanism requires use of an SDK, considered an undesirable intrusion into software development and desirably avoided when possible, and is limited to use in connection with executing a program. In other words, this authentication mechanism cannot be used generally for "static" data such as sound data, image data, or information generally.

The subject matter of the present invention provides a digital certificate format inherently assuring authenticity for both executable and static digital products embedded therein with protection against intentional or unintentional corruption. A person holding such a digital certificate holds a self-authenticating item which may be used to prove, for example, ownership, authentication of source, or unaltered state of an associated digitally stored item.

SUMMARY OF THE INVENTION

A method of creating a digital certificate under the present invention begins by defining in the certificate a protected area. At least one component is placed in the protected area and a value is calculated as a function of characters in the protected area. A digital signature is then appended to the certificate outside the protected area, the digital signature being encrypted and a function of the value calculated as a function of characters within the protected area.

The subject matter of the present invention is particularly pointed out and distinctly claimed in the concluding portion of this specification. However, both the organization and method of operation of the invention, together with further advantages and objects thereof, may best be understood by reference to the following description taken with the accompanying drawings wherein like reference characters refer to like elements.

BRIEF DESCRIPTION OF THE DRAWINGS

For a better understanding of the invention, and to show how the same may be carried into effect, reference will now be made, by way of example, to the accompanying drawings in which:

FIG. 1 illustrates a digital certificate format according to the present invention.

FIG. 10 illustrates by flow chart the details of retrieving a text-based component from the digital certificate of FIG. 1.

FIG. 11 illustrates by flow chart the details of retrieving a binary-based component from the digital certificate of FIG. 1.

FIG. 15 illustrates a second embodiment of the present invention including embedded binary-based components.

DETAILED DESCRIPTION OF THE PREFERRED EMBODIMENT

Figure 2:
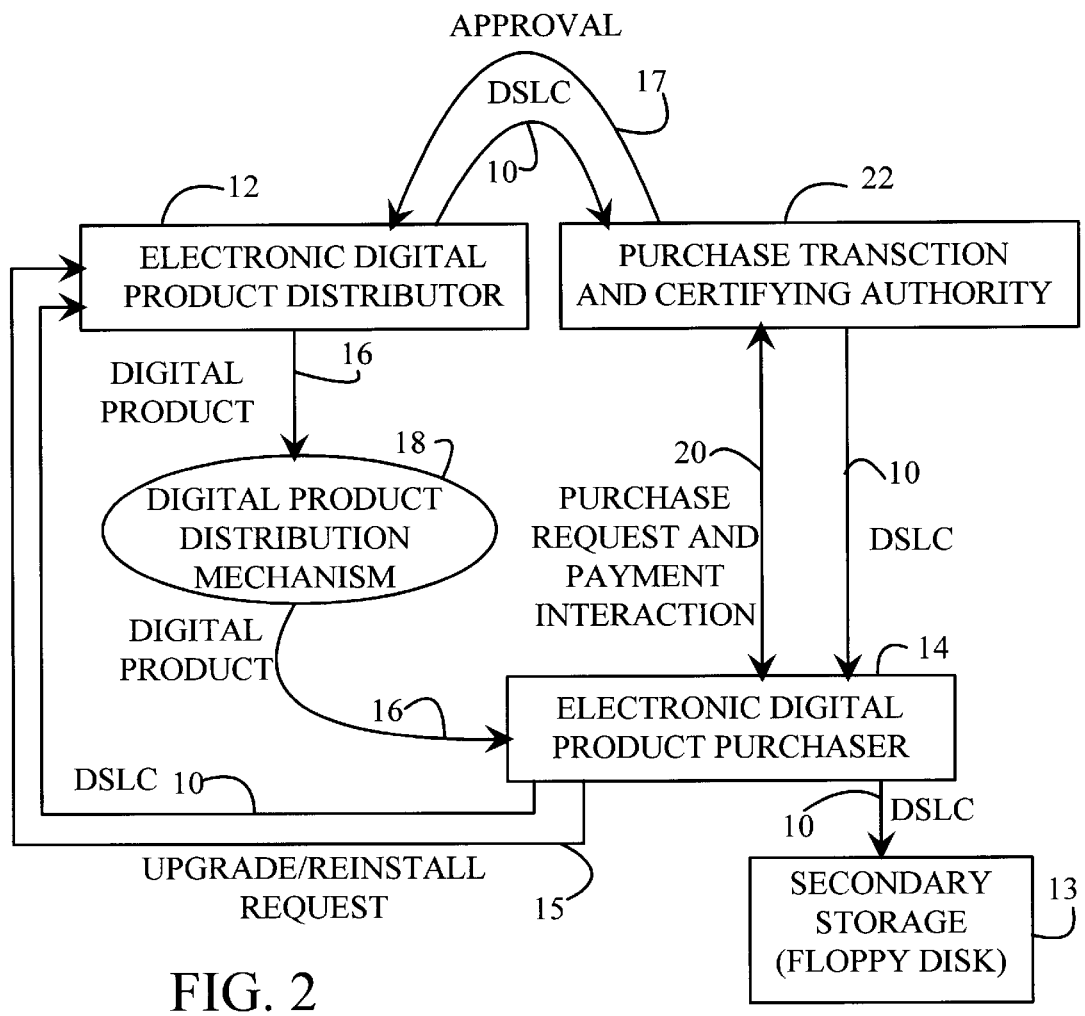
FIG. 2 illustrates use of the digital certificate of FIG. 1 in the context of electronic digital product distribution and purchase.

With reference to FIGS. 1 and 2, a first embodiment of the present invention is a digitally signed license certificate (DSLC) 10 issued as proof of ownership by a purchase transaction and certifying authority 22 to a digital product purchaser 14 of a given digital product 16. FIG. 2 illustrates a context for distribution wherein digital product purchaser 14 obtains a copy of product 16 originating from digital product distributor 12. Digital product 16 is obtained through an electronic digital product distribution mechanism 18. Digital product 16 may be computer programming, digital image or sound data, or any product digitally stored and available for purchase from digital product distributor 12. For example, mechanism 18 may be a shareware or "try before you buy" mechanism whereby purchaser 14 obtains a copy of digital product 16 for evaluation during a trial use period. Thus, purchaser 14 may obtain product 16 by downloading product 16 from a network connection, e.g., the Internet, or may obtain digital product 16 on a distribution medium, e.g., on a CD ROM. In any case, purchaser 14, under the illustrated example, has possession of digital product 16 and wishes to purchase product 16 by interaction with purchase transaction and certifying authority 22.

The various blocks illustrated in FIG. 2, e.g., distributor 12, authority 22, purchaser 14, and mechanism 18, represent various entities involved in the storage and sharing of digital information. Accordingly, each block corresponds, generally, to an entity having a processing and telecommunication device capable of exchanging digitally stored information and interacting via telecommunication devices.

Purchaser 14 and authority 22 engage in a purchase request and payment interaction 20. Interaction 20 may be conducted across a variety of platforms, e.g., direct one-to-one connection between a purchaser 14 computer and an authority 22 computer or via an intermediate network connection, e.g., via the Internet. In any case, purchaser 14 requests purchase of digital product 16 and provides some form of payment, e.g., provides a credit card number which authority 22 verifies and accepts as the financial aspect, i.e., payment aspect, of the transaction. Once the purchase is accomplished and digital product 16 is to be made available for full use by purchaser 14, e.g., the evaluation limitations removed, purchaser 14 receives DSLC 10 from authority 22. Once in the possession of purchaser 14, DSLC 10 proves ownership and legitimate possession or right to possession of digital product 16. For example, purchaser 14 may later require technical support with respect to product 16 and can, upon request, transmit DSLC 10 to a technical support entity to prove ownership and establish a right to technical support. Purchaser 14 may later wish to upgrade product 16 and, upon request, provide DSLC 10 to an appropriate entity authorizing delivery of an upgrade version of digital product 16.

DSLC 10 is a digitally signed, tamper resistant document serving, in this particular example, as "proof of purchase" for the electronically purchased product 16. DSLC 10 is a robust ASCII document containing only ASCII code set octets 32 through 127 with simple formatting making corruption visible to the user. In the particular embodiment illustrated herein, each line of DSLC 10 is of fixed length, exactly 60 characters, and framed at the beginning, i.e., column 1, and at the end, i.e., column 60 of each line with the pound character (#). As described more fully hereafter, DSLC 10 is subject to hashing algorithms, and only data within the framing characters, i.e., as contained in columns 2–59 in this example, is hashed for signature to avoid carriage return (CR), line feed (LF), CR/LF, or generally any line termination or trailing space problems. Furthermore, certain lines of certificate 10 contain all pound characters (#), i.e., a series of 60 pound characters (#) filling the entire line, and serve as a beginning and ending markers for application of hashing algorithms. As illustrated in FIG. 1, the first line 10a of certificate 10 contains all pound characters (#) indicating to a hashing algorithm that the following line 10b is where a hashing algorithm begins processing. A series of certificate components 11, described more fully hereafter, terminates with a second line 10c of pound characters (#), i.e., a series of 60 pound characters (#), indicating where the hashing algorithm ends processing. As described more filly hereafter, a digital signature component 11 follows line 10c of pound characters (#) and a final line 10d of pound characters (#) follows the digital signature component 11.

Generally, the pound characters (#) serve as a framing structure indicating where hashing algorithms apply. Extraneous content introduced into certificate 10 and falling outside of the pound character (#) framing is not subject to hashing or message digest algorithms and does not affect any hashing algorithm results. For example, when transmitting digital items via electronic mail or data exchange utilities additional characters may be added at the beginning or end of each line. Under the present invention, such characters fall outside a protected area established by the pound character (#) framing and structure therefore do not affect the result of hashing algorithms.

As may be appreciated, the particular format and framing characters selected for use in DSLC 10 may be varied without departing from the scope of the invention as claimed herein. For example, a protected area may be defined by a variety of methods, including methods without a fixed length line requirement. Other characters, or a variety of characters, may be defined as framing characters. In any event, the message digest or hashing algorithm, i.e., an algorithm calculating a value as a function of the content of the protected area, must be adapted to process only characters within the protected area. The particular format illustrated in FIG. 1 is acceptable for the purposes and objectives of this particular embodiment of the invention as illustrated herein, e.g., for providing a digitally signed license certificate as an electronic "proof of purchase" object. As will be discussed more fully hereafter, other digital certificates under the present invention may include other combinations of components and may be applied to other purposes and objectives.

DSLC 10 contains a series of components 11, with each component 11 occupying as many lines of DSLC 10 as necessary and including at least a tag field and a data field. The last line of each component terminates with a less than character (<) in column 59. For example, DSLC 10 as illustrated in FIG. 1 includes as its first component 11 a certificate number component 11a indicated with its tag field containing the string "Certificate:" and its data field containing the string "MSN001239987." Component 11a appears entirely on a single line of DSLC 10 and includes the component termination character, i.e., less than character (<), in column 59 of that line. A space is provided between the tag field of the component and the data field of the component as a separating marker. All text-based components of DSLC 10 follow this format.

As discussed more fully hereafter, a second component 11 format under the present invention applies to binary-based components (not shown in FIG. 1). Because binary-based components have a specific length, the formatting for binary-based components also includes, in addition to the tag field and data field, a length field indicating the length of the binary data field. This avoids any inclusion in the binary-based field of space characters existing between the end of the binary-based content and the component terminating character (<) appearing in column 59.

The particular components 11 present in DSLC 10 include certificate component 11a, licenser component 11b, product description component 11c, part number component 11d, catalog number component 11e, licensee component 11f, licensee organization component, 11g, location component 11h, support terms component 11i, FAQs component 11j, website component 11k, E-mail component 11l, voice number component 11m, FAX number component 11n, license terms component 11o, license expiration component 11p, signed by component 11q, signed on component 11r, and digital signature component 11s. For purposes of readability, DSLC 10 may include certain "blank lines" between selected ones of components 11, i.e., a pound character (#) in columns one and 60 with space characters therebetween. Not all of the components 11 illustrated in FIG. 1 are essential to implementation of a proof of purchase function. As can be seen, however, the components 11 shown in FIG. 1 include typical information items of interest to a purchaser of a digital product. For example, the purchase 14 has, by virtue of DSLC 10, information such as access to web sites, telephone numbers, and various product information useful during use or installation of product 16. More importantly, however, purchaser 14 has by virtue of possession of DSLC 10 proof of ownership of product 16.

Purchaser 14 can store DSLC 10 on his or her personal computer for use in a variety of contexts. It is suggested that purchaser 14 copy DSLC 10 to a secondary and removable storage device 13, e.g., a floppy disc, as a back up copy of DSLC 10. This back up copy of DSLC 10 may be employed to upgrade or reinstall product 16 at a later time. For example, purchaser 14 may require proof of ownership of digital product 16 in the event of as a loss of product 16 on his or her personal computer or a need to upgrade product 16 to a more recent version.

Purchaser 14 interacts with distributor 12 to perform an upgrade or reinstallation relative to digital product 16. Purchaser 14 submits DSLC 10 to distributor 12 along with a upgrade/reinstall request 15. Distributor 12 then passes this DSLC 10 to the purchase transaction and certifying authority 22. Because the authority 22 previously issued DSLC 10, it can verify its authenticity and track its history of use. In other words, only authority 22 has the correct decryption key needed to recalculate digital signature component 11s and verify authenticity of the DSLC 10 presented by distributor 12. Assuming validity for the DSLC 10, authority 22 returns an approval 17 to distributor 12. Distributor 12 then has authority to implement the request 15, i.e., provide a second copy of product 16 to user 14 or provide an upgraded version of product 16. As may be appreciated, should additional financial interaction be required, user 14 can perform such interaction, and if necessary obtain the appropriate DSLC 10, to qualify for an upgrade version if additional payment is required for such upgrade.

Because authority 22 tracks use of a given DSLC 10, only a limited, e.g., reasonable, number of reinstallation's would be allowed, this prevents widespread fraudulent use of DSLC 10. Each DSLC 10 would be unique per individual purchaser 14, and breaking a decryption code for a given DSLC 10 would not allow wide spread unauthorized use of a given product 16.

Thus, DSLC 10 as illustrated herein may be used as proof of purchase for a given digital product 16 and may be transmitted electronically through multiple parties and eventually to a trusted third party, i.e., authority 22, to reliably indicate proof of ownership. Other digital certificates, generally referred to herein as certificates 10, may be employed for other uses, as illustrated more fully hereafter, and may include any number of components 11, including embedded binary objects, for purposes of reliably transporting digital content to prove not only authenticity of source but to ensure against corruption as described more fully hereafter.

As a certificate 10 is created, a series of components 11, either text-based or binary-based components, are added to certificate 10 by simply formatting and appending such components, i.e., including the appropriate tag and data fields (and length field for binary-based components) framed within the pound characters (#). When this process is complete, line 10c of pound characters (#) are added, followed by the digital signature component 11s, followed by the final line 10d of pound characters (#). Construction of a digital certificate 10, therefore, is by formatting components 11 and appending components 11 to a simple ASCII file structure.

Figure 3:
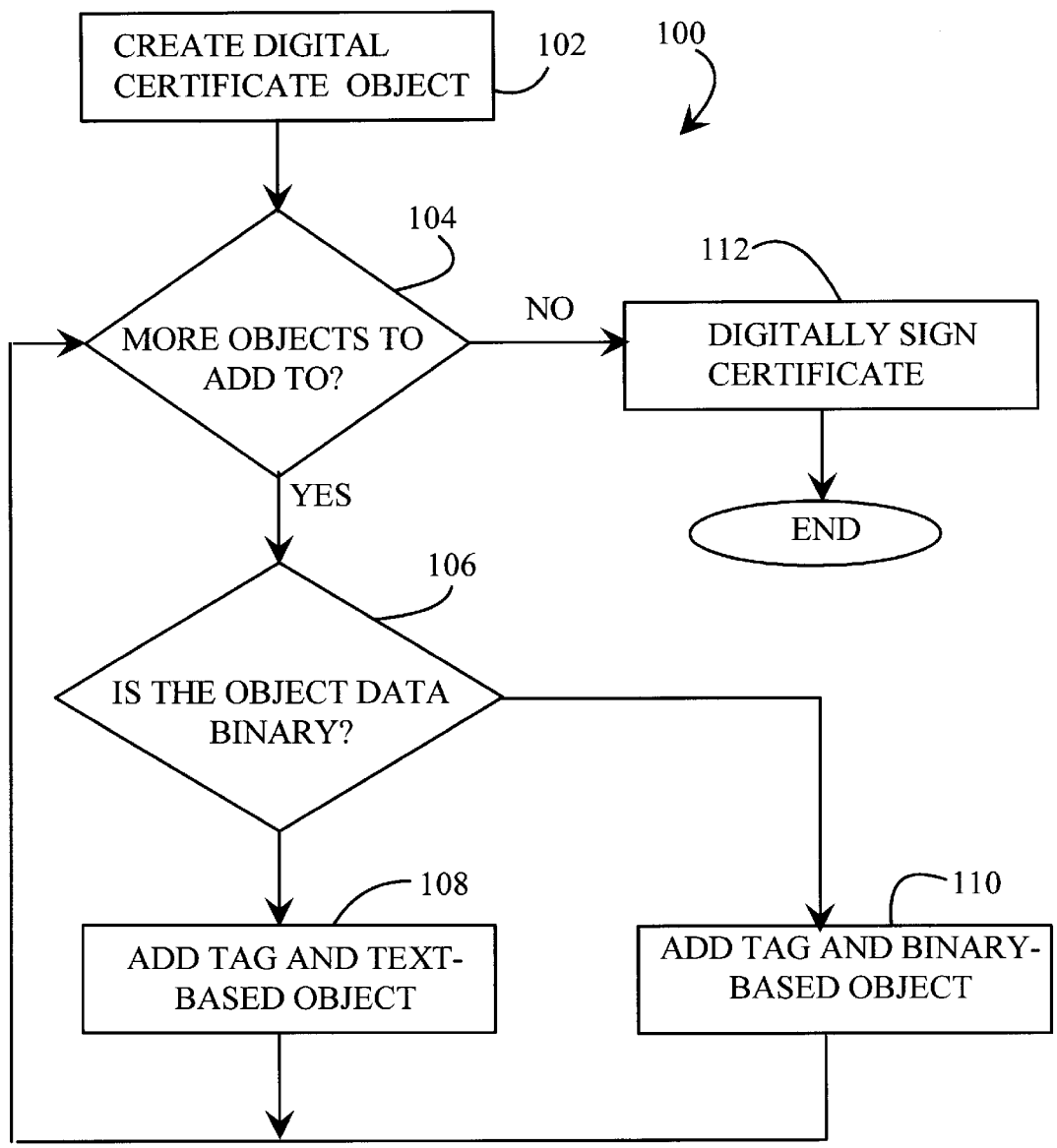
FIG. 3 illustrates by flow chart creation of a digital certificate and selective placement of components therein according to the present invention.

With reference to FIG. 3, the process of creating a digital certificate 10 begins in block 102 where an empty digital certificate 10 is initialized, i.e., the necessary memory space allocated and data structure established. Moving to decision block 104, the creator has opportunity to add multiple components 11 to digital certificate 10. If the creator wishes to add a component 11 to digital certificate 10, then processing branches to decision block 106 where the user indicates whether the component 11 to be added is a binary-based object or a text-based object. If the new component 11 is text-based, then processing branches from decision block 106 through block 108, where a tag field and associated data field are added and the terminator character (<) is placed in column 59 of the final component line. Processing then returns to decision block 104. If the new component 11 is a binary-based component 11, then processing branches through block 110 where the tag, length, and data fields are added followed by the terminating character (<) in column 59 of the last component line. Following block 110, processing returns to decision block 104. Thus, the creator of a digital certificate 10 iterates through the blocks 104, 106, and selectively 108 and 110 to add successively text-based and binary-based components 11 to a digital certificate 10 according to the formatting as indicated in FIG. 1. Eventually, digital certificate 10 contains a selected set of components 11, and the creator branches from decision block 104 to block 112 where certificate 10 is digitally signed with a digital signature component 11 and the create process terminates.

As may be appreciated, in connection with creating a new digital certificate 10, the entity creating the new digital certificate 10 would likely be responsible for creating an entry in a data base tracking use of that digital certificate 10. For example, each digital certificate 10 created could be placed in a data base which would later track subsequent requests for reinstalls, upgrades, and the like. Generally, any subsequent activity related to digital certificate 10 could be tracked for purposes of detecting unauthorized use. By referencing this data base in connection with the verification process, a single trusted entity, i.e., certifying authority 22, collects and tracks uses of each digital certificate 10 issued.

FIGS. 4–7 detail blocks 102, 108, 110, and 112, respectively, by separate flow charts.

Figure 4:
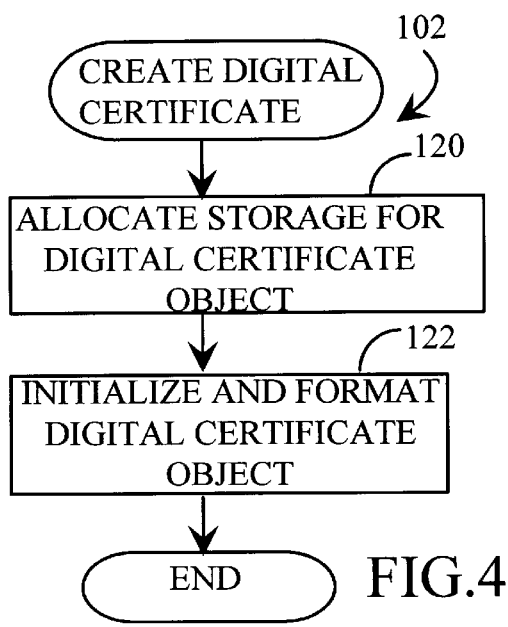
FIG. 4 illustrates by flow chart initialization of an empty digital certificate.

In FIG. 4, the process 102 for creating certificate 10 begins in block 120 where storage, i.e., memory, is allocated for certificate 10. In block 122, the new, i.e., empty, DSLC 10 is initialized and formatted. More particularly, initial formatting includes placement of the first line 10a of pound characters (#) and the second line 10b of certificate 10 containing the warning string "This document has been digitally signed! Do not alter!" as framed appropriately within the pound characters (#) in columns one and 60. Certificate 10 is, in this state, ready to receive a sequence of components 11, either text-based or binary-based components, by appending appropriately formatted components 11 thereto.

Figure 5:
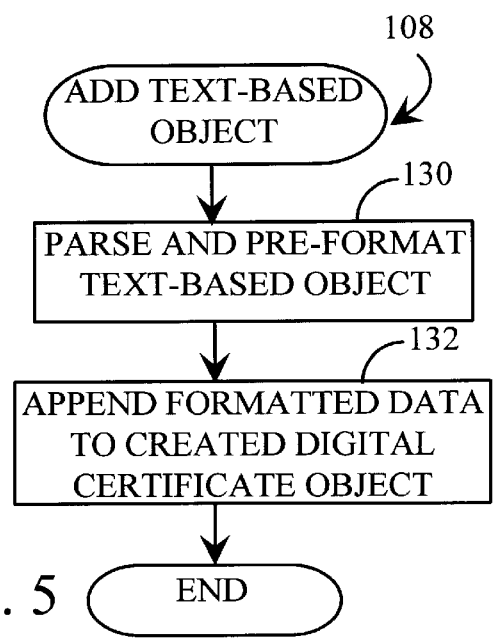
FIG. 5 illustrates by flow chart a process used to add a text-based component to the digital certificate of FIG. 1.

FIG. 5 illustrates process 108 where a text-based component 11 is added to a digital certificate 10. In block 130, the text-based object to be added is parsed and pre-formatted in block 130. More particularly, an appropriate tag field, separating space character, and sequence of text characters are framed within the pound characters (#) in columns one and 60 using as many lines of certificate 10 as necessary. Parsing a text-based component 11 requires that any pound characters (#) appearing in the text-based data field be preceded by a selected escape character, e.g., a percent symbol (%). Also, any escape characters, e.g., percent symbols (%), appearing in the text-based content must be indicated as legitimate text characters as opposed to escape characters. For example, where a percent symbol (%) actually appears in the text content a second percent symbol (%) is placed next to it as an indication of a non-escape character function. In this manner, the appropriate tag field is associated with the text and the text content is formatted as indicated in FIG. 1 in successive lines framed at column one and column 60 with the pound character (#) and having on the final line a terminating character (<) appearing in column 59. Also, to improve readability, certain components 11 may be preceded by a blank line also framed within pound characters (#), i.e., a pound character (#) in columns one and 60 and spaces in columns 2–59. In block 132, the new text-based object as formatted is appended to certificate 10.

Figure 6:
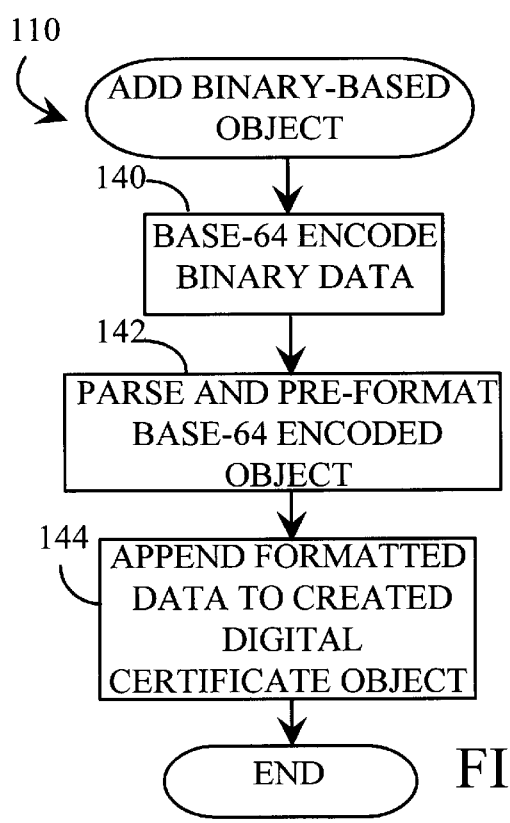
FIG. 6 illustrates by flow chart a process used to add a binary-based component to the digital certificate of FIG. 1.

In FIG. 6, the process of adding a binary-based component 11 to a certificate 10 begins in block 140 where the binary-based content is converted to the ASCII-code set, i.e., base-64 encoded. Because the binary content is base-64 encoded, the size of the binary content will increase, but has the advantage of being transmittable through virtually any transmission or data exchange mechanism without degradation or loss of information. Continuing to block 142, the base-64 encoded binary content is parsed and pre-formatted for use in certificate 10. Once the binary-based content has been converted to the ASCII-code set, parsing and pre-formatting may occur as described above in connection with text-based content in block 130 of FIG. 5. In other words, treated just as a text-based object but indicated as a binary-based object in the formatting provided, i.e., including a length field. Continuing to block 144, the formatted base-64 encoded binary object is appended to the certificate 10.

As indicated above, the creator of a certificate 10 successively adds components 11, either text-based or binary-based components 11, to certificate 10 in any desired order and establishes the appropriate formatting as indicated in FIG. 1. Eventually, the desired components 11 have been appropriately formatted and added to DSLC 10. For most applications, a certificate 10 should include at least one component 11, either a text-based or a binary-based component 11, a signing component 11, a date and time stamp component 11 indicating the time of signing, and a digital signature component 11.

Figure 7:
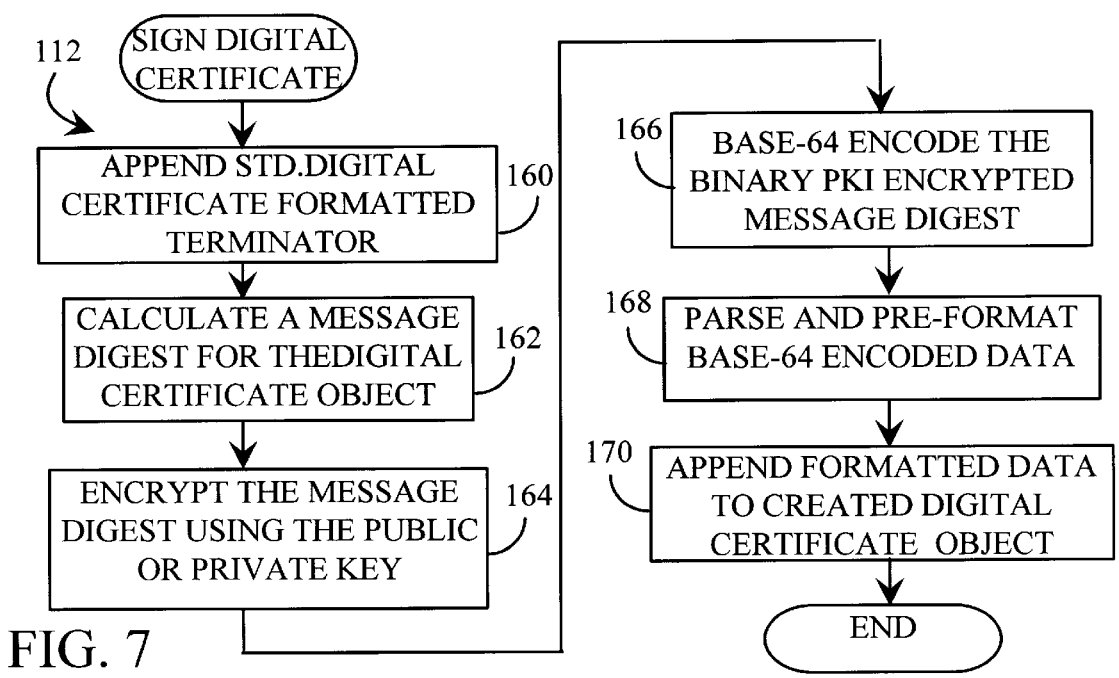
FIG. 7 illustrates by flow chart a process used to digitally sign the certificate of FIG. 1.

FIG. 7 illustrates the process 112 for digitally signing a certificate 10. In block 160, a standard terminator is appended to certificate 10, i.e., line 10c of sixty pound (#) characters. In block 162, a message digest for certificate 10 is calculated and, in block 164, the message digest is encrypted using one of a public key or a private key. Continuing to block 166, the binary PKI encrypted message digest is converted to the ASCII-code set, i.e., the binary PKI encrypted message digest is base-64 encoded. Again, all binary data represented in digital certificate 10 are base-64 encoded to ensure ability to transmit through virtually any transmission or data exchange mechanism without degradation or loss of information. Continuing to block 168, the base-64 encoded, encrypted message digest is parsed and pre-formatted for use in digital certificate 10 and, in block 170, appended with its tag field to the digital certificate 10. Following the digital signature component 11, the final line 10d of sixty pound characters (#) completes certificate 10.

Thus, digital certificate 10 conforms to a predetermined formatting standard including tag fields, data fields, length fields for binary-based content, and component terminator characters (<) in column 59 of the last line for each component 11. Importantly, each certificate 10 contains only characters taken from the ASCII code set, i.e., base-64 encoded where necessary, to ensure transmission or data exchange without degradation. Also, each digital certificate 10 is digitally signed with either a public key or a private key. Accordingly, only a certifying authority 22 having possession of the other key, i.e., public key in the case of a certificate 10 digitally singed with a private key or a private key in the case of a certificate 10 signed with a public key can, receive a digital certificate 10 and verify any given digital certificate 10. Important to note, however, the digital certificate 10 may be transmitted to a certifying authority 22 by a variety of data exchange or data transmission mechanisms and any number of intermediary entities. Because of the framing structure provided, any extraneous characters introduced into certificate 10 through such data exchange or transmission mechanisms are ignored during hashing and message digest calculation. Accordingly, the certifying authority 22 receiving a certificate 10 correctly calculates a message digest and decrypts a digital signature.

Figure 8:
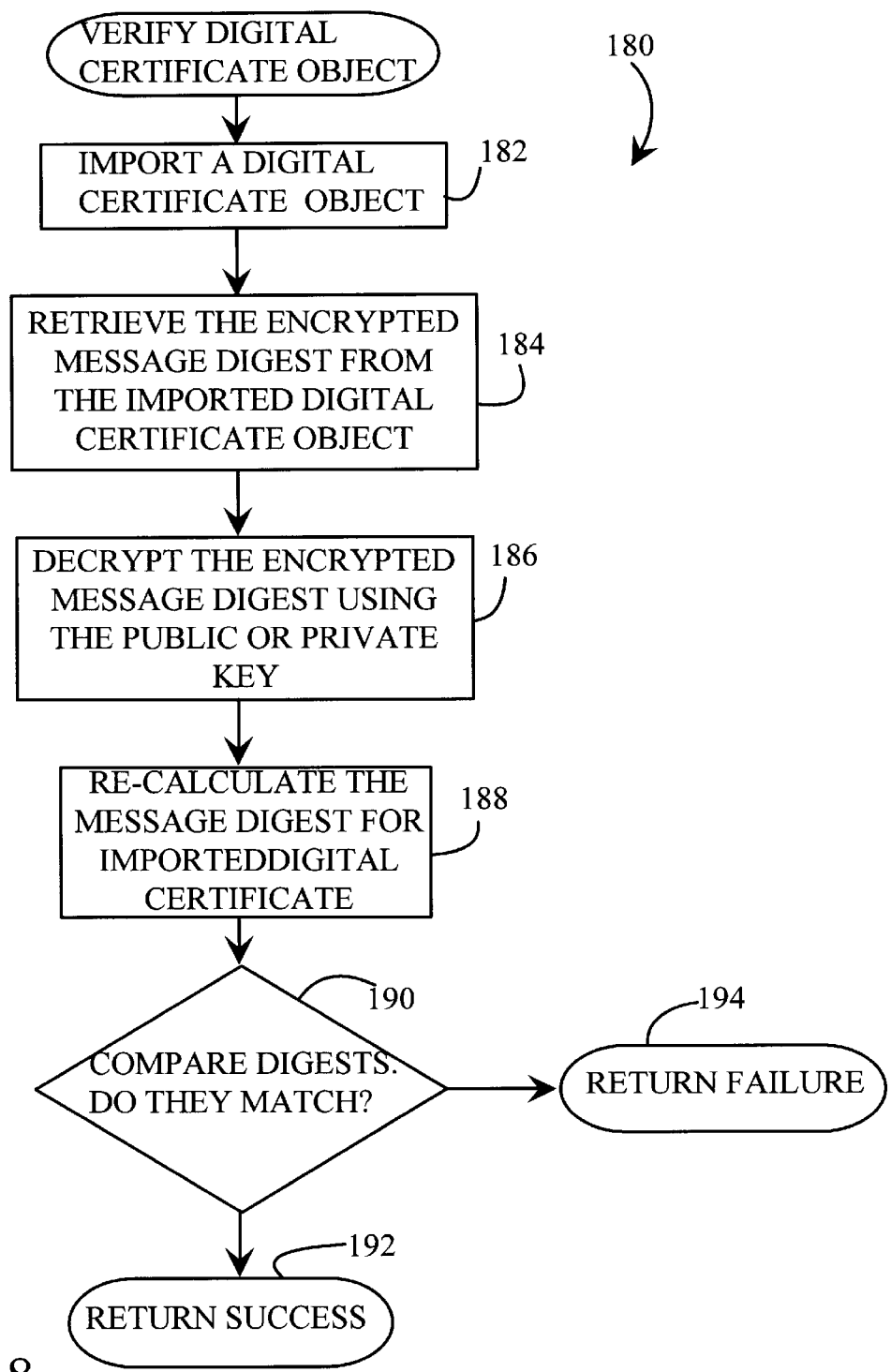
FIG. 8 illustrates by flow chart a process used to verify a digital certificate under the present invention.

FIG. 8 illustrates by flow chart a verifying process 180 used by, for example, certifying authority 22 to validate a digital certificate 10. In block 182, certifying authority 22 receives a digital certificate 10. In block 184, authority 22 retrieves the encrypted message digest from the imported digital certificate 10. In block 186, authority 22 decrypts the encrypted message digest using either the public key or the private key, whichever is necessary to decrypt the encrypted message digest. In block 188, authority 22 recalculates the message digest for this particular digital certificate 10. In decision block 190, the decrypted message digest obtained in block 186 is compared to the recalculated message digest obtained in block 188. If the two message digests match, then in block 192 certifying authority 22 indicates a successful digital certificate 10 verification. Otherwise, i.e., if the two message digests do not match, certifying authority 22 indicates a verification failure in block 194.

The formatting and structure of digital certificate 10 advantageously allows incorporation of either text-based components or binary-based components in a given digital certificate 10. For example, the certificate number, licenser name, product description, licensee name, technical support terms and license terms, all text-based objects, may be incorporated as desired into a given digital certificate 10. Furthermore, binary-based objects may be incorporated into digital certificate 10 yet be reliably transmitted due to the base-64 encoding provided under the present invention. In this aspect, a digital certificate 10 may be used to reliably transport or contain virtually any digital item, e.g., programs, image data, sound data, photo-identification and the like.

Figure 9:
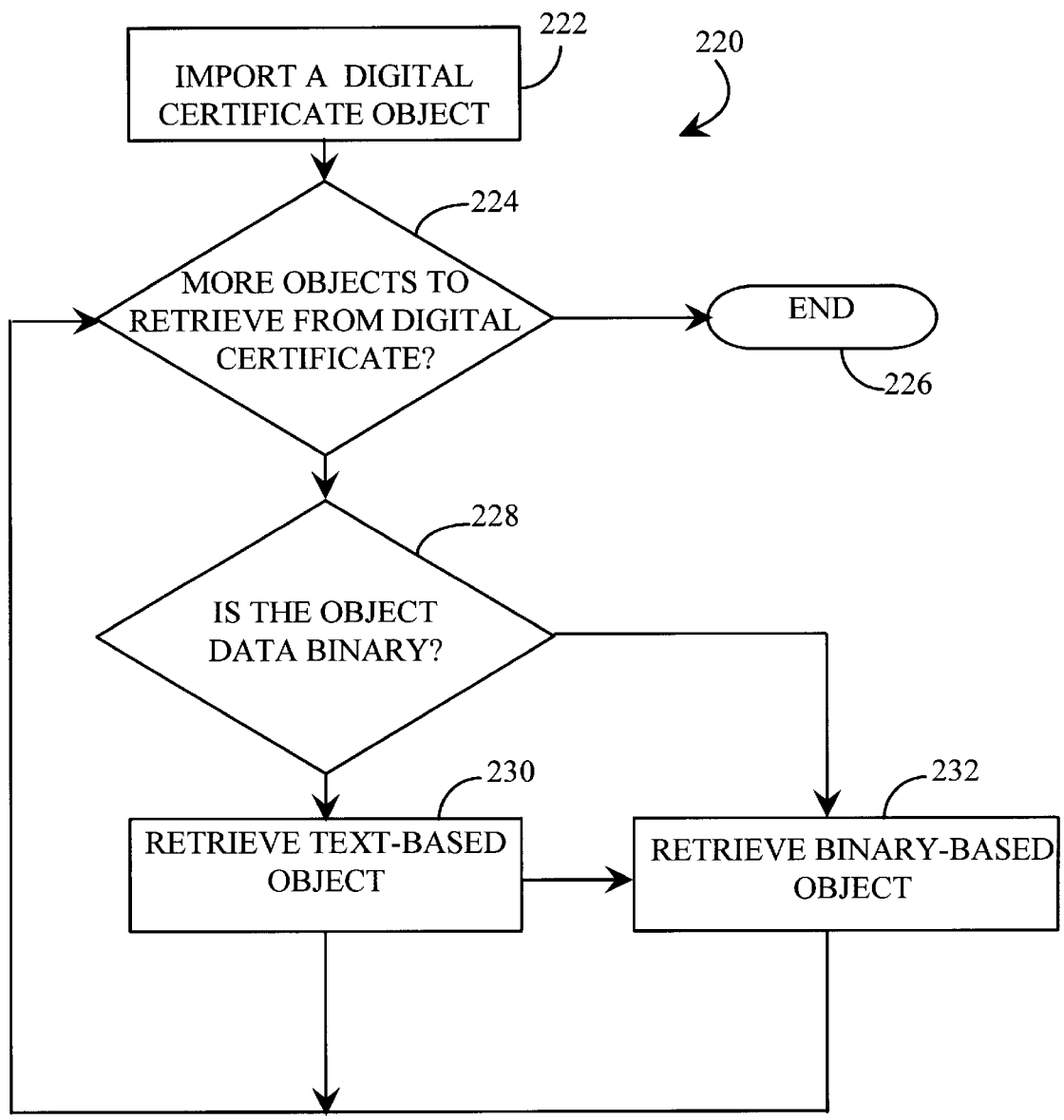
FIG. 9 illustrates by flow chart a process used to retrieve either text-based or binary-based components from the digital certificate of FIG. 1.

FIG. 9 illustrates by flow chart a retrieve process 220 used to retrieve either a text-based component 11 or a binary-based component 11 from a given digital certificate 10. In block 222, a digital certificate 10 is imported and one or more components may be retrieved therefrom. Decision block 224 provides opportunity to retrieve the first, or additional, components 11 from the certificate 10. If one, or additional, components are to be retrieved from the certificate 10, then processing advances to block 228 to determine the type, i.e., text or binary, of component 11 to be retrieved. If the component 11 is not a binary object, then processing branches through block 230 where the text-based component 11 is retrieved and processing returns to decision block 224. If, however, decision block 228 determines that the component 11 to be retrieved is binary-based, then processing branches through block 232 where the binary component 11 is retrieved and processing returns to block 224. Eventually, all components 11 to be retrieved from certificate 10 are retrieved, and processing branches from decision block 224 and process 220 terminates at block 226. FIGS. 10 and 11 illustrate in more detail the process of blocks 230 and 232, respectively, for retrieving text-based and binary-based components 11 from a certificate 10.

In FIG. 10, the process 230 for retrieving a text-based component 11 from certificate 10 begins in block 240 where the appropriate tag field is identified in certificate 10. For example, if a licensee name component" is to be retrieved, then the string "Licensee:" is searched for and identified in certificate 10. Once identified, block 242 copies the associated data field from certificate 10. In block 244, the certificate 10 formatting is removed and the copied content is made available as a retrieved text-based object.

In FIG. 11, the process 232 for retrieving a binary-based object from certificate 10 begins in block 250 where the appropriate tag field is identified by searching through certificate 10. In block 252, the corresponding data field is copied and, in block 254, the certification 10 formatting removed. As may be appreciated, in retrieving the binary-based data field, the length field must be referenced to avoid inclusion of any spaces provided in certificate 10 in the last line of the component between the end of the binary-based data field and the terminating character (<) found in column 59. Advancing to block 256, the binary-based content is converted back to binary form, i.e., base-64 decoded, to its original state for use as a binary object.

Certificate 10 as described herein including formatting protecting certificate components against corruption when transmitted and containing only characters in the ASCII code set, has use across a variety of applications.

Figure 12:
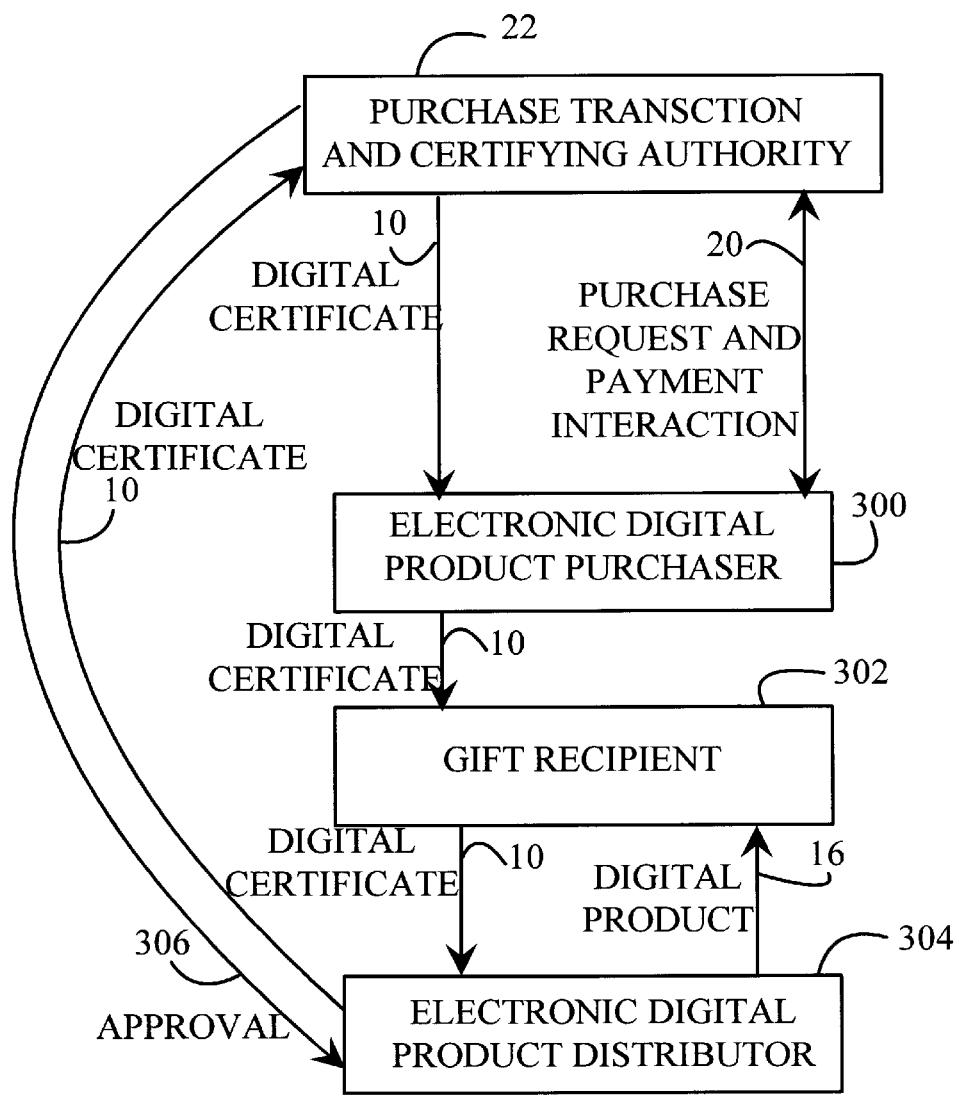
FIG. 12 illustrates use of a digital certificate according to the present invention as a gift certificate.

FIG. 12 illustrates use of certificate 10 as a gift certificate. In FIG. 12, a purchaser 300 interacts with a purchase transaction and certifying authority 22 to receive a certificate 10 representing a given digital product 16 and indicating, e.g., in one of the components of certificate 10, that the certificate 10 is a gift certificate entitling the bearer to receive possession of a particular digital product 16. Once purchaser 300 has possession of the digital certificate 10, purchaser 300 may deliver, e.g., by electronic transmission, certificate 10 to a gift recipient 302. Gift recipient 302 then transmits certificate 10 to a product distributor 304. Product distributor 304 routes the certificate 10 to purchase transaction and certifying authority 22. Purchase transaction and certifying authority 22 authenticates the certificate 10, e.g., by reference to its internal data base reflecting and tracking the previous purchase of product 16 by purchaser 300. Once authenticated, authority 22 delivers an approval 306 to product distributor 304. Distributor 304, having the approval 306, then delivers digital product 16 to gift recipient 302.

Under this distribution scheme, purchaser 300 need not actually possess digital product 16, yet may pay for product 16 and rely on certificate 10 as a mechanism allowing recipient 22 to obtain digital product 16. Product distributor 304 similarly has confidence in the authenticity of certificate 10 and the validity of a request by recipient 302 to receive digital product 16. As may be appreciated, once authority 22 delivers approval 306 to distributor 304, any subsequent presentation of digital certificate 10 could be refused approval as authority 22 would maintain an indication within its internal data base that that particular certificate 10 had been redeemed. Feedback (not shown) from distributor 304 to authority 22 may be employed to indicate that product 16 had in fact been delivered. Also, recipient 302 could receive a certificate 10 from purchase and transaction authority 22 similar to that shown in FIG. 2 as proof of ownership and valid possession of product 16.

Figure 13:
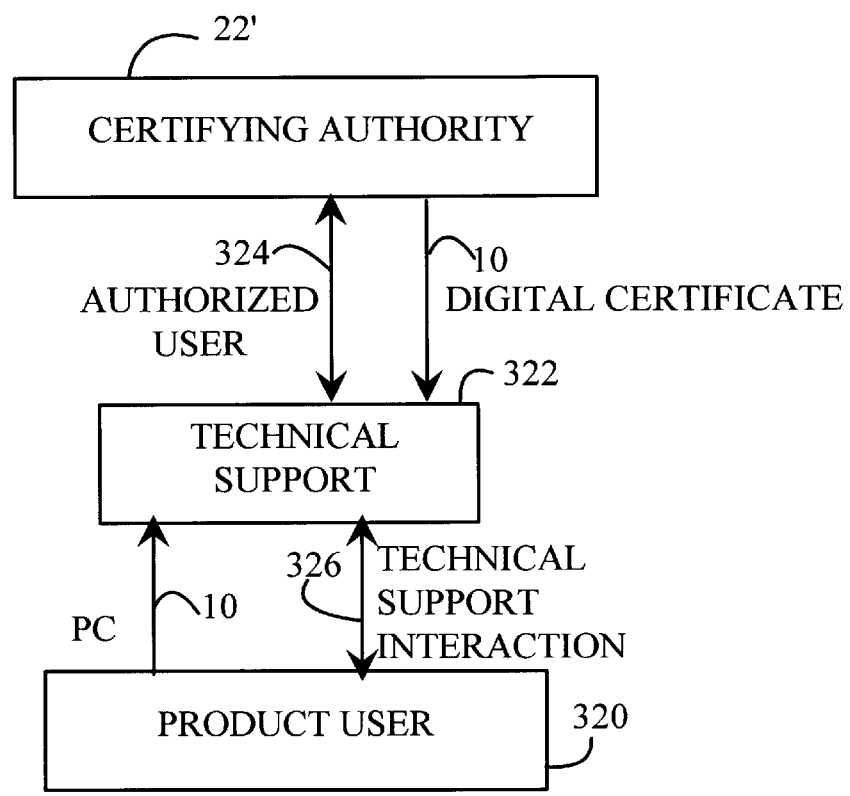
FIG. 13 illustrates use of a digital certificate according to the present invention to implement authorized technical support for a given product and product user.

FIG. 13 illustrates use of a certificate 10 according to the present invention in the context of providing technical support to an authorized user of a particular digital product. In FIG. 13, a user 320 has possession of and makes use of a particular digital product 16. User 320 is entitled to technical support for digital product 16, but must prove valid possession and right to such technical support. Under the present invention, certificate 10 provides proof of such right to technical support. User 320 electronically transmits certificate 10 to a technical support entity 322. Technical support entity 322 in turn electronically transmits certificate 10 to authority 22. Authority 22 validates certificate 10 and returns an authorized user indication 324 to technical support entity 322. Technical support entity 322, having indication that user 320 is an authorized user, interacts with user 320 as indicated at technical support interaction 326 to provide user 320 with technical support for product 16.

Figure 14:
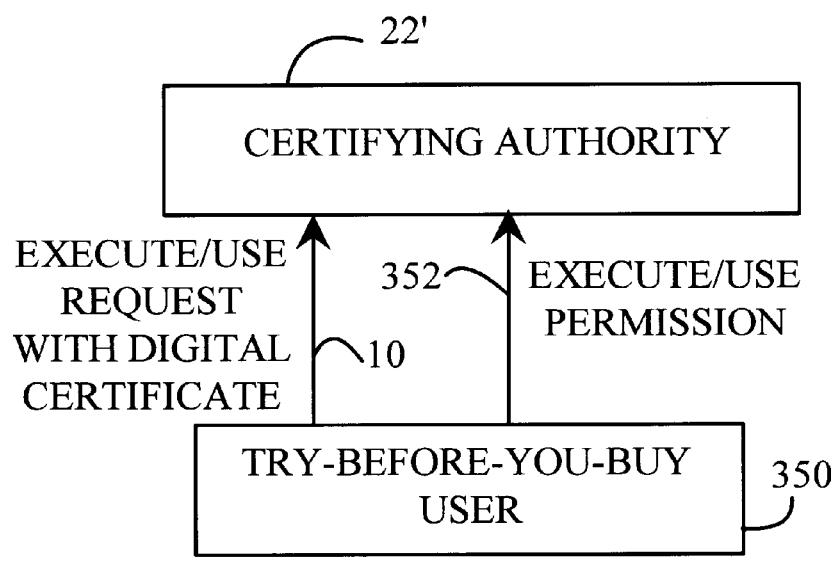
FIG. 14 illustrates use of a digital certificate according to the present invention to authorize execution or use of a digital product on a "try before you buy" distribution scheme.

FIG. 14 illustrates execution control by use of certificate 10 in the context of a "try-before-you-buy" product distribution scheme. In FIG. 14, a "try-before-you-buy" user 350 has possession of an evaluation copy of a digital product and has, under the "try-before-you-buy" distribution scheme, permission to use product 16 on a limited basis, e.g., a certain number of executions or execution during a particular time period. Each time user 350 executes or attempts to use the particular digital product 16, an execution/use request with a certificate 10 is electronically transmitted to certifying authority 22. For example, upon execution of the digital product, digital product 16 initiates a telecommunications, e.g., by direct connect or via the Internet, interaction with certifying authority 22 indicating a request to execute product 16 and including the certificate 10 associated with product 16. Certifying authority 22 validates certification 10, e.g., determines whether the certificate 10 is valid and determines whether or not this particular execution of product 16 is to be allowed. If the execution is to be allowed, then certifying authority 22 delivers an execute/use permission 352 to user 50 and program 16 executes. Because the certification of digital certificate 10 is performed at a remote site, a particularly high level of security is provided against fraudulent use of digital product 16. Under some "try-before-you-buy" electronic distribution schemes a decryption key is hidden locally somewhere within or in association with the digital product. Unfortunately, such hidden local decryption keys are often found and published whereby widespread fraudulent use is made of the product. Under the illustrated "try-before-you-buy" distribution scheme of FIG. 14, however, no potential for such fraudulent use of product 16 exists because validation of certificate 10 and determination as to whether execution is to be allowed occurs at a remote location and by a trusted certifying authority 22.

In addition to protection provided against intentional or unintentional corruption of a certificate 10, the formatting and use of certificate 10 under the present invention virtually makes impossible attachment of viruses to embedded object, e.g., executable binary objects. It is, as a practical matter, virtually impossible to attach a virus to a text document. Because all data contained within certificate 10 is base 64 encoded, it is virtually impossible to attach a virus to such base 64-encoded programming. Virus infection would have to occur prior to incorporation into the certificate 10. Such infection is highly unlikely because the original publisher controls the content prior to embedding a binary executable in a certificate 10. Thus, third party entities could not maliciously introduce a virus into a binary executable object embedded within a certificate 10. Digital certificates 10 under the present invention provide all the advantages of "code signing" to prove authenticity of source and insure against corruption in a given digital product. However, such features under the present invention do not require use of a software development kit (SDK) and all its attendant peripheral effects on software development. Generally, formatting under a certificate 10 follows tag/content formatting, i.e., labeled content, making very convenient incorporation of tagged data items, e.g., such as taken off a form, into a certificate 10.

FIG. 15 illustrates another embodiment of a certificate 10 under the present invention including embedded binary-based components. More particularly, the certificate 10 of FIG. 15 conforms to the above-described formatting including a framing structure defining a hashing area protected against corruption due to insertion of additional characters, e.g., insertion of additional characters at the beginning or end of lines. Also, the entire document is an ASCII code set document plainly viewable and transmittable across a variety of data exchange and transmission schemes. Individual components 19 in the certificate of FIG. 15 include an overview component 19a, a first bitmap (binary-based) component 19b, a second bitmap (binary-based) component 19c, a signed on component 19d, a signed by component 19e, and a digital signature component 19f. Both of the binary-based components, i.e., components 19b and 19c, are base-64 encoded and, when properly retrieved from the certificate 10 of FIG. 15, i.e., formatting removed and base-64 decoded, Microsoft Windows formatted bitmaps. As may be appreciated, however, any binary-based data can be embedded in and transported using a certificate 10 under the present invention. While digital certificates under the present invention are robust and can carry any number of selected components, some applications would likely included certain components. In a try-before-you-buy context, where controlling the number of executions or allowing execution during a specific time period, it would be important to identify the user, the merchant whose product you are attempting to use and the product. In a database, all of these identifiers could be represented by a single identifier. So, in this example the Try-Before-You-Buy server or certificate author generates a unique digital certificate including the following components:

User Identifier (name of user, or his login id, or his system id, etc.)

Product Name (name of product being tried)

Publisher (The publisher of the product)

Trial Period (Length of trial, number of executions time interval)

Terms and Conditions (Details of allowed use)

Unique Transaction ID (issued by the certificate author)

For a gift certificate application, the following components are suggested:

Sender/Purchaser Information (from Bob Jones)

Recipient information (to Mary Evans)

Salutation, greeting, or reason for gift (for a job well done . . . )

Terms and Conditions (Use by Dec. 31, 1997)

Dollar value of gift or specific redemption value ($50.00 or 1 copy of DOOM)

How to redeem instructions (Just e-mail to . . . or visit www.xxx.com, or download from this address)

Date issued

It will be appreciated that the present invention is not restricted to the particular embodiment that has been described and illustrated, and that variations may be made therein without departing from the scope of the invention as found in the appended claims and equivalents thereof.

What is claimed is:

1. A method of creating a digitally stored digital certificate, the method comprising the steps:

selecting a given character set;

designating from said given character set a protected area border character;

providing said certificate as a sequence of members of said given character set;

defining in said certificate a protected area as members of said given character set located between one and a next occurrence of said protected area border character;

storing at least one digital component in said protected area;

calculating a digital value as a function of digital content stored in said protected area; and storing a digital signature in said certificate but outside said protected area, said digital signature being encrypted and a function of said value.

2. A method according to claim 1 wherein said protected area is further defined by storage of said border characters wherein said one and said next occurrence of said border character are distinguished from a content occurrence of said border character forming a portion of said digital content.

3. A method according to claim 2 wherein said certificate includes line elements, and at least one of said line elements begins with one of said border characters and ends with one of said border characters.

4. A method according to claim 1 wherein said at least one component comprises a tag field and at least one of a length field and a data field.

5. A method according to claim 4 wherein said data field includes only characters from a restricted character set.

6. A method according to claim 5 wherein said restricted character set corresponds to a subset of an ASCII code character set.

7. A method according to claim 4 wherein said data field is a binary-based data converted from a binary data set to a restricted character set.

8. A method according to claim 7 wherein said restricted character set is a subset of an ASCII code character set.

9. A method according to claim 7 wherein said converted binary-based data is converted to said restricted character set by encoding according to base-64 encoding.

10. A method according to claim 1 wherein said value is a message digest value.

11. A method according to claim 1 wherein said value is calculated by application of a hashing algorithm to characters only in said protected area.

12. A method according to claim 1 wherein said digital signature is converted from a binary data set to a restricted character set.

13. A method according to claim 12 wherein said restricted character set is a subset of an ASCII code set.

14. A method according to claim 12 wherein said converted digital signature is converted to said restricted character set by encoding according to base-64 encoding.

15. A digitally stored digital certificate comprising:

a digital storage medium;

a digital certificate data structure stored upon said storage medium, said data structure defining a protected area as including a sequence of characters occurring between one and a next occurrence of a designated protected area border character;

at least one digital component stored in said protected area; and a digital signature stored in said certificate data structure but outside said protected area, said digital signature being encrypted and a function of said at least one digital component stored in said protected area.

16. A digital certificate according to claim 15 wherein said protected area is established by storing protected area border characters in a sequence of characters comprising said digital certificate data structure.

17. A digital certificate according to claim 16 wherein said certificate data structure includes line elements, and at least one of said line elements begins with one of said border characters and ends with one of said border characters.

18. A digital certificate according to claim 15 wherein said at least one component comprises a tag field and at least one of a length field and a data field.

19. A digital certificate according to claim 18 wherein said data field includes only characters taken from a restricted character set.

20. A digital certificate according to claim 19 wherein said restricted character set corresponds to a subset of an ASCII code character set.

21. A digital certificate according to claim 21 wherein said data field is a binary-based data converted from a binary data set to a restricted character set.

22. A digital certificate according to claim 21 wherein said restricted character set is a subset of an ASCII code character set.

23. A digital certificate according to claim 21 wherein said converted binary-based data is converted to said restricted character set by encoding according to base-64 encoding.

24. A digital certificate according to claim 15 wherein said value is a message digest value.

25. A digital certificate according to claim 15 wherein said value is calculated by application of a hashing algorithm to characters only in said protected area.

26. A digital certificate according to claim 15 wherein said digital signature is converted from a binary data set to a restricted character set.

27. A digital certificate according to claim 26 wherein said restricted character set is a subset of an ASCII code set.

28. A digital certificate according to claim 26 wherein said converted digital signature is converted to said restricted character set by encoding according to base-64 encoding.

29. A digitally stored digital certificate of product ownership of a given product by a given product owner, said certificate comprising:

a digital storage medium;

a digital certificate data structure stored upon said storage medium, said data structure defining a protected area as including a sequence of characters occurring between one and a next accurrence of a designated protected area border character,;

a first digital component stored in said protected area and identifying said given product;

a second digital component stored in said protected area and identifying said given product owner; and a digital signature in said certificate data structure but outside said protected area, said digital signature being encrypted and a function of at least said first and second components stored in said protected area.

30. A digital certificate according to claim 29 wherein said protected area is established by storing framing characters in said digital certificate data structure.

31. A digital certificate according to claim 30 wherein said certificate data structure includes line elements, and at least one of said line elements begins with one of said framing characters and ends with one of said framing characters.

32. A digital certificate according to claim 29 wherein said value is a message digest value.

33. A digital certificate according to claim 29 wherein said value is calculated by application of a hashing algorithm to content of said protected area.

34. A digital certificate according to claim 29 wherein said digital signature is converted from a binary data set to a restricted character set.

35. A digital certificate according to claim 34 wherein said restricted character set is a subset of an ASCII code set.

36. A digital certificate according to claim 34 wherein said converted digital signature is converted to said restricted character set by encoding according to base-64 encoding.

* * * * *